United States Patent
Moenkemueller

(10) Patent No.: US 10,457,164 B2
(45) Date of Patent: Oct. 29, 2019

(54) SEAT-OCCUPANCY AND OCCUPANT-CLASS DETECTOR FOR MOTOR-VEHICLE SEAT

(71) Applicant: paragon GmbH & Co. KgaA, Delbrueck (DE)

(72) Inventor: Ralf Moenkemueller, Bielefeld (DE)

(73) Assignee: PARAGON GMBH & CO. KGaA, Delbrueck (DE)

( * ) Notice: Subject to any disclaimer, the term of this patent is extended or adjusted under 35 U.S.C. 154(b) by 0 days.

(21) Appl. No.: 16/140,582

(22) Filed: Sep. 25, 2018

(65) Prior Publication Data
US 2019/0092189 A1    Mar. 28, 2019

(30) Foreign Application Priority Data
Sep. 27, 2017   (DE) .................. 10 2017 009 004

(51) Int. Cl.
*G08B 21/00*   (2006.01)
*B60N 2/00*    (2006.01)
*B60R 21/015*  (2006.01)

(52) U.S. Cl.
CPC ........ *B60N 2/002* (2013.01); *B60R 21/01516* (2014.10)

(58) Field of Classification Search
CPC .......................... B60N 2/002; B60R 21/01516
USPC ......................................................... 340/667
See application file for complete search history.

(56) References Cited

U.S. PATENT DOCUMENTS

| 2015/0054495 A1* | 2/2015 | Lem ..................... A61B 5/0408 324/126 |
| 2015/0102024 A1* | 4/2015 | Barfuss .................. B62D 1/046 219/204 |
| 2016/0317047 A1* | 11/2016 | Sugiyama ............ A61B 5/6893 |

* cited by examiner

*Primary Examiner* — Tanmay K Shah
(74) *Attorney, Agent, or Firm* — Andrew Wilford

(57) ABSTRACT

A seat-occupancy and occupant-class detector for a vehicle seat having a back part and a seat part has an insulated but conductive surface element mounted on the seat part of the vehicle seat roughly parallel to a seat cushion thereof. A signal generator feeds an electrical measuring signal to the surface element, and first and second receiving electrodes are provided in the backrest at different spacings from the surface element but vertically level with each other such that the measuring signal of the surface element induces different voltages in the receiving electrodes. Calculation and evaluation steps performed in an evaluation unit take as their basis a value that is a quotient of different measurements for the same physical size and is therefore dimensionless. The reason for this is the arrangement of the two receiving electrodes at a different spacing from the conductive surface element on the seat cushion side.

5 Claims, 2 Drawing Sheets

SEAT-OCCUPANCY AND OCCUPANT-CLASS DETECTOR FOR MOTOR-VEHICLE SEAT

FIELD OF THE INVENTION

The present invention relates to a seat-occupancy and occupant-class defector for motor-vehicle seat.

BACKGROUND OF THE INVENTION

The invention relates to a seat-occupancy and occupant-class detector for a motor-vehicle seat having a conductive surface element that mounted on insulation on a seat part of the vehicle seat roughly parallel to the seating surface thereof and that can be fed a measuring signal, and a sensor arrangement in a back part of the vehicle seat and that can detect the measuring signal applied to the conductive surface element on the seat part.

Seat-occupancy and occupant-class detectors of this kind are used in conjunction with smart airbag systems to ensure airbags are actuated as required. Seat-occupancy and occupant-class detectors of this kind are often used in the passenger seat.

Seat-occupancy and occupant-class detectors of this kind are intended to ensure by their passenger classification devices that when the passenger seat being occupied by a vehicle passenger, it is possible to determine what kind of person is sitting in the passenger seat, and it should moreover be possible to detect the sitting position of the person concerned in the passenger seat. The person located in the passenger seat should be classifiable in different passenger classes.

It is also possible in principle that with the seat-occupancy and occupant-class detector a vehicle passenger is reminded to fasten a seat belt, for which purpose the seat-occupancy and occupant-class detector can be connected to a seat belt reminder (SBR).

Classification of the vehicle passengers is undertaken in order to be able to control adaptive restraint system components depending on the passenger class determined for the person occupying the vehicle seat in each case.

The following passenger classes are employed in this case:
- Class 0: Empty seat
- Class 1: 1-year old child in child seat or younger
- Class 1 or Class 2: Person between a 1-year old child and a 5th percentile female
- Class 2: light adult≥5th percentile female
- Class 3: heavy adult≥50th percentile male The 5th percentile female is a statistical measure for a woman below which 5% of all women fall. A 50th percentile male is a statistical measure for a man that is exceeded or not reached by 50% of men.

Depending on the passenger class determined for the vehicle passenger occupying the vehicle seat, the seat-occupancy and occupant-class detector according to the invention supplies a defined output signal. This output signal is fed to an airbag control device that performs the activation or deactivation of the passenger airbag.

Insofar as the vehicle passenger concerned falls into classes 0 or 1, the corresponding passenger airbag is deactivated. If the vehicle passenger concerned falls into classes 2 or 3, the passenger airbag is activated.

For seat occupancy detection and passenger classification devices of this kind for vehicle seats, different sensory principles are applied. These involve camera systems, ultrasound systems, weighing sensors and the like, for example.

Capacitive measuring devices are frequently used on account of their simple design and reliability. An insulated conductive surface is integrated in a seat part of the vehicle seat. This creates capacitance relative to the vehicle mass. As soon as a vehicle passenger approaches this conductive surface, the capacitance thereof changes. The capacitance is transformed by charge sensors or oscillating circuits into a signal that can be measured by a microcomputer.

Substantial disadvantages of measuring devices of this kind lie in the influencing of the measurement by side-effects, such as for example liquid on the seat part, seat pads, etc. Particularly when the vehicle passenger comes into contact with grounded surfaces or, for example, has on their lap a notebook connected to the vehicle's electrical system, the capacitance alters dramatically, leading to substantial measuring inaccuracies and errors.

Moreover, due to the sensitivity of the sensory system and the large measuring surface in the case of measuring devices of this kind, there is a high degree of sensitivity with respect to electromagnetic disturbances.

OBJECTS OF THE INVENTION

It is therefore an object of the present invention to provide an improved seat-occupancy and occupancy-class detector for a vehicle seat.

Another object is the provision of such an improved seat-occupancy and occupancy-class detector for a vehicle seat that overcomes the above-given disadvantages, in particular that is more reliable than the prior-art systems.

SUMMARY OF THE INVENTION

A seat-occupancy and occupant-class detector for a vehicle seat having a back part and a seat part has according to the invention an insulated but conductive surface element mounted on the seat part of the vehicle seat roughly parallel to a seat cushion thereof. A signal generator feeds an electrical measuring signal to the surface element, and first and second receiving electrodes are provided in the backrest at different spacings from the surface element but vertically level with each other such that the measuring signal of the surface element induces different voltages in the receiving electrodes.

According to the invention, calculation and evaluation steps to be performed in an evaluation unit take as their basis a value that is a quotient of different measurements for the same physical size and is therefore dimensionless. The reason for this is the arrangement of the two receiving electrodes at a different spacing from the conductive surface element on the seat cushion side.

According to an advantageous development of the invention, a voltage induced in the first receiving electrode and a voltage induced in the second receiving electrode can be detected in an evaluation unit, and a quotient can be calculated from the two detected voltages and based on the calculated quotient it is possible to determine whether the vehicle seat is occupied by a vehicle passenger or not.

In order to be able to determine with sufficient accuracy whether the vehicle passenger is in a leaning position in the vehicle seat, it is proposed that the sensor arrangement on the backrest part of the detector has at least two receiving electrodes that are in the vertical direction of the backrest part at a different vertical spacing from the seat cushion of the seat part and at the same spacing from the supporting surface of the backrest part.

Advantageously, in the evaluation unit of the seat-occupancy and occupant-class detector, a voltage induced in the receiving electrode at a smaller vertical spacing from the seat cushion and a voltage induced in the receiving electrode at a greater vertical spacing from the seat cushion are detected and through a comparison of the two induced voltages it is possible to determine whether an upper region of the body of the vehicle passenger is roughly parallel to or inclined relative to the inclination of the leaning surface of the backrest part of the vehicle seat in the vertical direction.

In order to be able to draw conclusions as to the size of the vehicle passenger with a high degree of reliability, it is advantageous for the sensor arrangement of the seat-occupancy and occupant-class detector on the backrest part side to have two receiving electrodes at a distance from one another in the upper region of the backrest part at the same spacing from the seat cushion of the vehicle seat and at the same spacing from the supporting surface of the backrest part.

Voltages induced in the two receiving electrodes in the upper region of the backrest part are advantageously detectable in the evaluation unit of the seat occupancy detection and passenger classification device and through a comparison of the voltages induced in the one with those in the other receiving electrode, it is possible to determine whether an upper region of the body of the vehicle passenger is roughly parallel to or inclined relative to the horizontal direction of the supporting surface of the backrest part of the vehicle seat.

According to an advantageous development of the seat-occupancy and occupant-class detector according to the invention, a first adjustment value can be determined in the evaluation unit from the voltage induced in the receiving electrode in the backrest part in the thickness direction thereof close to the supporting surface and the quotient of the voltages induced in this receiving electrode and in the receiving electrode in the backrest part in the thickness direction thereof at a greater spacing from the supporting surface. This adjustment value depends on the sitting position of the vehicle passenger on the seat cushion of the seat part of the vehicle seat.

Furthermore, it is advantageous if a second adjustment value can be determined in the evaluation unit from the voltage induced in the receiving electrode in the lower region of the backrest part in the thickness direction thereof close to the supporting surface and from the voltage induced in the receiving electrode at a vertical spacing above this receiving electrode at the same spacing from the supporting surface. This second adjustment value depends on the inclination of the sitting position of the vehicle passenger relative to the inclination of the supporting surface of the backrest part in the vertical direction.

According to a further advantageous embodiment of the seat-occupancy and occupant-class detector according to the invention, a body size of the vehicle passenger can be calculated in the evaluation unit of said seat occupancy detection and passenger classification device based on the voltages induced in the receiving electrodes in the upper region of the backrest part at the same spacing from the supporting surface of the backrest part, based on the adjustment value depending on the sitting position of the vehicle passenger on the seat cushion of the vehicle seat and based on the adjustment value depending on the inclination of the sitting position of the vehicle passenger relative to the inclination of the supporting surface of the backrest part in the vertical direction by a formula or table stored in the evaluation unit.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
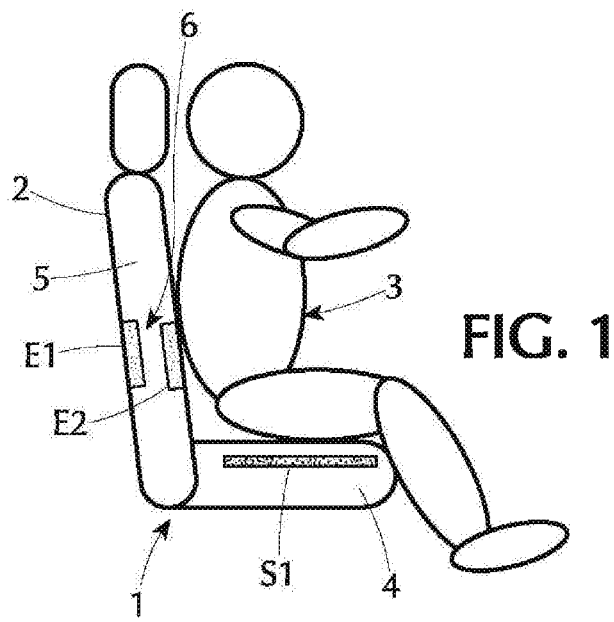
FIG. 1 is a schematic side view of a first embodiment of the invention.
Figure 2:
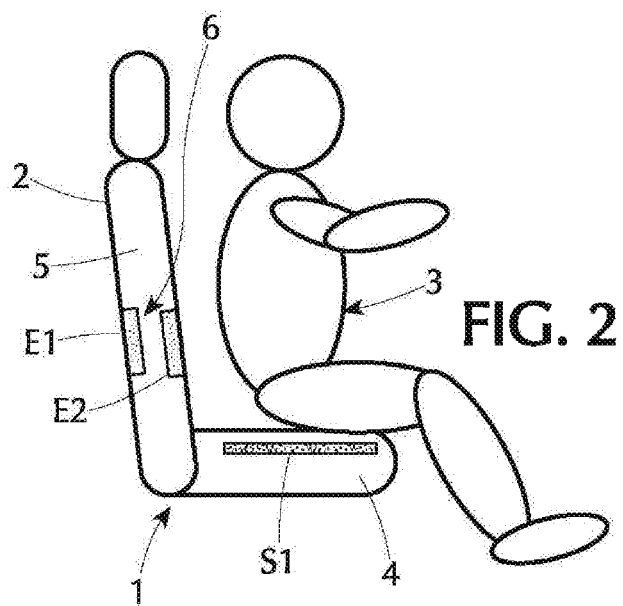
FIG. 2 is a view like FIG. 1 but with the seat occupant differently positioned.

As seen in FIG. 1, a seat-occupancy and occupant-class detector 1 shown schematically in FIGS. 1 and 2 is provided, as described below, in order to determine whether a vehicle seat 2 is occupied by a passenger 3. It should moreover be possible to determine whether the vehicle passenger 3 is an adult, a child, a baby, etc.

An insulated, conductive surface element S1 is integrated in a seat part 4 of the vehicle seat 2. This conductive surface element S1 is roughly parallel to a seat cushion of the seat part 4 of the vehicle seat 2. An electrical measuring signal is applied to the conductive surface element S1. The measuring signal may advantageously be sinusoidal. The use of a sinusoidal signal is advantageous, as it can be generated with a smaller technical outlay and does not have any harmonic waves. At most, small but negligible harmonic wave fractions could occur in the case of real sinusoidal signals due to distortions.

A sensor arrangement in a backrest part 5 of the vehicle seat 2 has a first receiving electrode E1 and a second receiving electrode E2. The two receiving electrodes E1 and E2 are in the same vertical portion of the backrest part 5 of the vehicle seat and are offset laterally and horizontally to each other as shown in particular in FIG. 4. Moreover, the two receiving electrodes E1 and E2 are offset relative to one another in the horizontal thickness direction of the backrest part 5 of the vehicle seat 2, as shown in FIGS. 1 and 2. The first receiving electrode E1 is close to the rear face of the backrest part 5, the second receiving electrode E2 is close to the front support surface of the backrest part 5.

The two receiving electrodes E1 and E2 are connected to an evaluation unit 7.

The measuring signal applied to the conductive surface element S1 in the seat part 4 of the vehicle seat 2 induces a measurable voltage in the two receiving electrodes E1 and E2 in the backrest part 5 of the vehicle seat 2. This measurable voltage depends on the electrode surfaces, the spacings between the receiving electrodes E1 and E2 and the conductive surface element S1 and the materials between the conductive surface element S1 and the receiving electrodes E1 and E2.

A comparatively small voltage is used for the measuring or transmitting signal. In the case of an unoccupied vehicle seat 2, measuring voltages are only a few mV in the receiving electrodes E1 and E2 in the backrest part side with an electrode surface of 8 $cm^2$, for example. Such measuring voltages can be measured very effectively and without interference in the evaluation unit 7 by special receiving circuits.

Insofar as the vehicle seat 2 is occupied by a vehicle passenger 3, the body of the vehicle passenger 3 conducts the electrical field significantly more effectively from the conductive surface element S1 on the seat part side to the receiving electrodes E1 and E2 on the backrest part side, due to its very low impedance compared with air. Depending on the spacing between the body of the vehicle passenger 3 occupying the vehicle seat 2 and the receiving electrodes E1 and E2 having an electrode surface of about 8 cm$^2$, measuring voltages are then induced in the receiving electrodes E1 and E2 and may be greater by a factor of 100 than the voltages that are induced in the case of an unoccupied vehicle seat 2.

If the vehicle passenger 3 then makes a movement or adopts a position in which an electrical connection is established between the body of the vehicle passenger 3 and the body of the vehicle, a large part of the electrical field is dissipated from the body of the vehicle passenger 3 to the vehicle mass. The electrical voltage induced in the receiving electrodes E1 and E2 then drops sharply to a value that may lie below a tenth of the previous value. The measuring signal detected in the receiving electrodes E1 and E2 on the backrest part side may then still be sufficient for a reliable decision to be made as to whether the vehicle seat 2 is occupied by a vehicle passenger 3 or not. A clear passenger classification is still possible in the case of the previously described arrangement of the receiving electrodes E1 and E2, as the two receiving electrodes E1 and E2 on the backrest part side are in the same vertical region of the backrest part 5, but at different front-to-back spacings from the seat part 4 or the conductive surface element S1 integrated in the seat part 4.

With the design of the receiving electrodes E1 and E2 on the backrest part side, consideration is given to the fact that the electrical characteristics thereof are such that a measuring voltage ratio between the two measuring voltages detected in the receiving electrodes E1 and E2 results that only depends on the spacing of the body of the vehicle passenger from the backrest part 5 or from the two receiving electrodes E1 and E2, but not on the field strength resulting from the measuring signal applied to the conductive surface element S1 on the seat part side.

As already mentioned, this is achieved through the spatial separation of the two receiving electrodes E1 and E2 at different spacings from the conductive surface element 1S on the seat part side. It should be noted that the field strength of the undisturbed electric field drops off in accordance with the cube of the spacing (R') from the conductive surface element S1. In a vehicle seat 2 these characteristics may be substantially different on account of the metal structure of the vehicle seat 2, however these characteristics are clear and reproducible for the seat construction.

These characteristics may be induced by different measures, e.g. by grounding of the metal structure of the seat by grounded screening surfaces in the region of the receiving electrodes E1 and E2, according to the desired characteristics.

As already mentioned, for the further signal processing in the evaluation unit 7, the ratio or the quotient of the measuring signals detected in the first receiving electrode E1 and in the second receiving electrode E2 is created:

$Q=U(E2)/U(E1)$

Q is therefore dimensionless and changes depending on the spacing between the body of the vehicle passenger 3 and the supporting surface of the backrest part 5 or the receiving electrodes E1 and E2.

Accordingly, Q is also not dependent on the voltage level of the measuring signal U introduced into the conductive surface element 81 on the seat part.

It is possible to draw a clear conclusion from the value of Q as to whether the vehicle seat 2 is occupied by a vehicle passenger 3 or not.

For the following observations it is assumed that the receiving electrodes E1 and E2 have an identical electrode surface area and that there is a spacing of about 4 cm between the two receiving electrodes E1 and E2.

In a situation in which the vehicle seat 2 is not occupied by a vehicle passenger 3, in the first receiving electrode E1 close to the rear surface of the backrest part 5 only a slightly smaller voltage is induced than in the receiving electrode E2 close to the supporting surface of the backrest part 5. Q then is in a range>0.7.

If a vehicle passenger 3 sits in the vehicle seat 2 in the normal position, i.e. with his/her body leaning against the supporting surface of the backrest part 5, the clothing of the vehicle passenger 3 and the cover of the backrest part 5 produces a spacing between the body of the vehicle passenger 3 and the second receiving electrode E2 of about 2 to 3 ca. In this position of the vehicle passenger 3 shown in FIG. 1, Q is in a range between 0.2 and 0.3.

If the body of the vehicle passenger 3 slips forward on the seat part 4 of the vehicle seat 2, the difference between the voltage detected at the first receiving electrode E1 on the rear surface of the backrest part 5 and at the second receiving electrode E2 on the front surface of the backrest part 5 diminishes. The corresponding position of the vehicle passenger 3 in the vehicle seat 2 is shown in FIG. 2. In this position, Q lies in a range between 0.3 and 0.5.

With an adjustment table previously established or set up and stored in the evaluation unit 7 or an adjustment function stored in the evaluation unit 7, an adjustment factor K1 is determined from the value of the receiving electrode E2 close to the supporting surface of the backrest part 5 and the value Q.

In order to be able to classify the body size of the vehicle passenger 3, two receiving electrodes E4 and E5 are fitted in the backrest part 5 of the vehicle seat 2 in a region level with the shoulders of the vehicle passenger 3. Due to the voltages induced in the receiving electrodes E4 and E5, a conclusion can only be reliably reached as to the body size of the vehicle passenger 3 if it is certain that the body of the vehicle passenger 3 is sitting comparatively straight and, where possible, parallel to the supporting surface of the backrest part 5.

In order to address this problem, a further sensor in the form of a third receiving electrode E3 is provided in the backrest part 5 of the vehicle seat 2. This sensor electrode E3 is at the same spacing from the supporting surface of the backrest part 5 as the second receiving electrode E2.

Figure 3:
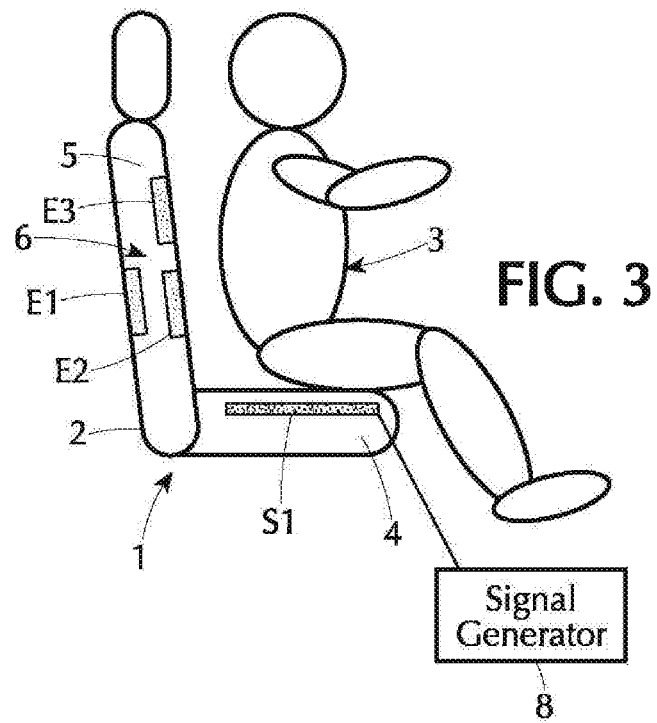
FIG. 3 is another schematic side view of a second embodiment of the invention with the seat occupant as in FIG. 2.
Figure 4:
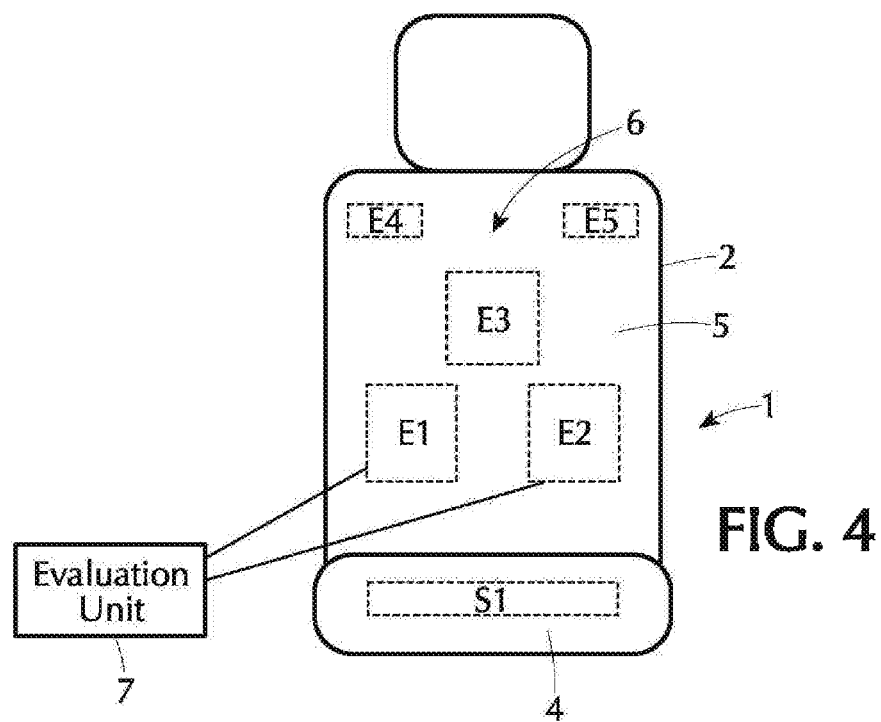
FIG. 4 is a schematic front view of the system of this invention.

As shown in FIGS. 3 and 4, in particular, this third receiving electrode E4 is vertically slightly above the second receiving electrode E2 close to the supporting surface of the backrest part 5 of the vehicle seat 2.

If the evaluation unit 7 detects that the voltages induced in the second receiving electrode E2 in the backrest part side and in the third receiving electrode E3 in the backrest part side are roughly the same size, it can be assumed from this that the vehicle passenger 3 is sitting with his/her body roughly straight and parallel to the supporting surface of the backrest part 5 of the vehicle seat 2.

Conclusions can be drawn from deviations in the values detected for the second receiving electrode E2 and the third receiving electrode E3 with respect to the inclination of the body of the vehicle passenger 3 relative to the backrest part 5. If this inclination is known, a previously determined adjustment value K2 for the body size can be taken from a table stored in the evaluation unit 7 for a small region of the inclination.

As already mentioned, the two receiving electrodes E4 and E5 are provided in the portion of the backrest part 5 at the shoulder region of the vehicle passenger 3. With the help of the voltages U (E4) and U (E5) induced in the fourth receiving electrode E4 and the fifth receiving electrode E5, it is possible to determine whether the vehicle passenger 3 is sitting on the vehicle seat 2 with his/her body straight or twisted.

The body size of the vehicle passenger 3 can be determined most reliably if the passenger is sitting in the vehicle seat 2 body straight and centered. In this case, the voltages U (E4) and U (E5) induced in the receiving electrodes E4 and E5 are substantially of the same magnitude.

These voltages U (E4) and U (E5) received at the receiving electrodes E4 and E5 can be averaged and weighted where necessary.

The value determined in this way is then multiplied by the two adjustment factors K1 and K2 referred to above. The correspondingly calculated adjusted value is then used as an index in a previously calculated body size table stored in the evaluation unit that is not shown in the figures.

I claim:

1. A seat-occupancy and occupant-class detector for a vehicle seat having a back part and a seat part, the detector comprising:
   an insulated but conductive surface element mounted on the seat part of the vehicle seat roughly parallel to a seat cushion thereof;
   signal-generating means for feeding to the surface element an electrical measuring signal forming an electrical field extending from the seat part into the back part; and
   first and second receiving electrodes in the backrest at different spacings from the surface element but vertically level with each other such that the field formed by the surface element induces different voltages in the receiving electrodes;
   a third electrode vertically offset in the seat back from the first and second electrodes and at a different spacing from the surface element than the first and second electrodes; and
   evaluating means connected to the first and second electrodes for forming a quotient from the voltages induced therein, whereby the quotient indicates whether or not the seat is occupied, the evaluating means also being connected to the third electrode and comparing the voltages induced in the second and third electrodes to determine whether an occupant of the seat is oriented parallel to the seat back.

2. The detector defined in claim 1, wherein the quotient also is indicative of a position of an occupant of the seat.

3. A seat-occupancy and occupant-class detector for a vehicle seat having a back part and a seat part, the detector comprising:
   an insulated but conductive surface element mounted on the seat part of the vehicle seat roughly parallel to a seat cushion thereof;
   signal-generating means for feeding to the surface element an electrical measuring signal forming an electrical field extending from the seat part into the back part; and
   first and second receiving electrodes in the backrest at different spacings from the surface element but vertically level with each other such that the the field generated by the surface element induces different voltages in the receiving electrodes;
   fourth and fifth electrodes in the seat back at the same vertical spacing from the surface element and at the same horizontal spacing from a front face of the seat back; and
   evaluating means connected to the first and second electrodes for forming a quotient from the voltages induced therein, whereby the quotient indicates whether or not the seat is occupied, the evaluating means also being connected to the fourth and fifth electrodes and comparing voltages induced therein by the measuring signal of the surface element for determining if an occupant of the seat is sitting with his/her back parallel to the front face of the seat back.

4. A seat-occupancy and occupant-class detector for a vehicle seat having a back part and a seat part, the detector comprising:
   an insulated but conductive surface element mounted on the seat part of the vehicle seat roughly parallel to a seat cushion thereof;
   signal-generating means for feeding to the surface element an electrical measuring signal forming an electrical field extending from the seat part into the back part;
   first and second receiving electrodes in the backrest at different spacings from the surface element but vertically level with each other such that the the field generated by the surface element induces different voltages in the receiving electrodes;
   a third electrode vertically offset in the seat back from the first and second electrodes and at a different spacing from the surface element than the first and second electrodes; and
   evaluating means connected to the first and second electrodes for forming a quotient from the voltages induced therein, whereby the quotient indicates whether or not the seat is occupied, the evaluating means determining a second adjustment value from the voltage induced in the receiving electrode in the lower region of the backrest part in the thickness direction thereof close to the supporting surface and from the voltage induced in the receiving electrode at a vertical spacing above this receiving electrode at the same spacing from the supporting surface, the second adjustment value depending on the inclination of the sitting position of the vehicle passenger relative to the inclination of the supporting surface of the backrest part in the vertical direction.

5. A seat-occupancy and occupant-class detector for a vehicle seat having a back part and a seat part, the detector comprising:
   an insulated but conductive surface element mounted on the seat part of the vehicle seat roughly parallel to a seat cushion thereof;
   signal-generating means for feeding to the surface element an electrical measuring signal forming an electrical field extending from the seat part into the back part; and
   first and second receiving electrodes in the backrest at different spacings from the surface element but vertically level with each other such that the the field generated by the surface element induces different voltages in the receiving electrodes;

fourth and fifth electrodes in the seat back at the same vertical spacing from the surface element and at the same horizontal spacing from a front face of the seat back;

evaluating means connected to the first and second electrodes for forming a quotient from the voltages induced therein, whereby the quotient indicates whether or not the seat is occupied, the evaluating means calculating a body size of the vehicle passenger based on the voltages induced in the receiving electrodes in an upper region of the backrest part at the same spacing from the supporting surface of the backrest part, based on the adjustment value depending on the sitting position of the vehicle passenger on the seat cushion of the vehicle seat and based on the adjustment value depending on the inclination of the sitting position of the vehicle passenger relative to the inclination of the supporting surface of the backrest part in the vertical direction by means a formula or table stored in the evaluating means.

* * * * *